United States Patent
Reiter et al.

(10) Patent No.: US 11,948,738 B2
(45) Date of Patent: Apr. 2, 2024

(54) SYSTEMS AND METHODS FOR A SOLENOID HAVING A PERMANENT MAGNET

(71) Applicant: HUSCO Automotive Holdings LLC, Waukesha, WI (US)

(72) Inventors: Joseph Reiter, Waukesha, WI (US); Matt Pellmann, Summit, WI (US)

(73) Assignee: HUSCO Automotive Holdings LLC, Waukesha, WI (US)

(*) Notice: Subject to any disclaimer, the term of this patent is extended or adjusted under 35 U.S.C. 154(b) by 62 days.

(21) Appl. No.: 17/081,374

(22) Filed: Oct. 27, 2020

(65) Prior Publication Data

US 2021/0125765 A1 Apr. 29, 2021

Related U.S. Application Data

(60) Provisional application No. 62/926,937, filed on Oct. 28, 2019.

(51) Int. Cl.
*H01F 7/16* (2006.01)
*H01F 7/08* (2006.01)
*H01F 7/122* (2006.01)

(52) U.S. Cl.
CPC .......... *H01F 7/1615* (2013.01); *H01F 7/081* (2013.01); *H01F 7/122* (2013.01); *H01F 2007/163* (2013.01)

(58) Field of Classification Search
CPC ........ H01F 7/1615; H01F 7/081; H01F 7/122; H01F 2007/163; H01F 2007/1669;

(Continued)

(56) References Cited

U.S. PATENT DOCUMENTS 3,952,272 A * 4/1976 Howell, Jr. ........... H01F 7/1607
335/279
4,462,013 A * 7/1984 Ueda ..................... H01F 7/1615
335/229

(Continued)

FOREIGN PATENT DOCUMENTS

DE 29803511 U1 5/1998
DE 102009030479 A1 12/2010

OTHER PUBLICATIONS

TLXTechnologies. YouTube video entitled: "Solenoid Fundamentals: Magnetic Latching Solenoids," uploaded Oct. 15, 2020. Retrieved May 25, 2021. https://www.youtube.com/watch?v=tvSo7CXQQ7c.

*Primary Examiner* — Bernard Rojas
(74) *Attorney, Agent, or Firm* — Quarles & Brady LLP

(57) ABSTRACT

A solenoid is provided. The solenoid includes a housing, a pole piece, an end plate formed with or coupled to the housing, a wire coil arranged within the housing, a permanent magnet arranged between the pole piece and the end plate, an armature configured to selectively move between a first position and a second position in response to a current applied to the wire coil, and a spring configured to bias the armature. When the wire coil is de-energized, the armature is maintained in at least one of the first position and the second position. The first position is configured to be maintained by the spring and the second position is configured to be maintained by magnetic attraction between the armature and the permanent magnet through engagement between the armature and the pole piece.

18 Claims, 8 Drawing Sheets

(58) Field of Classification Search
CPC .... F16K 31/003; F16K 31/082; F16K 31/084; H02K 33/02
See application file for complete search history.

(56) References Cited

U.S. PATENT DOCUMENTS

| | | | |
|---|---|---|---|
| 5,896,076 A * | 4/1999 | van Namen | H01F 7/1615 335/229 |
| 8,159,806 B2 | 4/2012 | Cartier-Millon | |
| 2002/0093408 A1* | 7/2002 | Morita | H01H 33/6662 335/220 |
| 2004/0093718 A1* | 5/2004 | Takeuchi | H01H 33/6662 218/138 |
| 2006/0028311 A1* | 2/2006 | Burger | H01F 7/1607 335/229 |
| 2013/0021124 A1* | 1/2013 | Kulke | H01F 7/1615 335/229 |
| 2014/0111295 A1* | 4/2014 | Mehta | B21J 15/02 72/340 |

* cited by examiner

SYSTEMS AND METHODS FOR A SOLENOID HAVING A PERMANENT MAGNET

CROSS-REFERENCES TO RELATED APPLICATIONS

The present application is based on and claims priority to U.S. Provisional Patent Application No. 62/926,937, filed on Oct. 28, 2019, which is incorporated herein by reference in its entirety.

STATEMENT REGARDING FEDERALLY SPONSORED RESEARCH

Not Applicable.

BACKGROUND

Solenoids typically include a wire coil that may be selectively energized (i.e., supplied with current having a particular magnitude and direction) to move an armature between one or more positions.

BRIEF SUMMARY

In some aspect, the present disclosure provides a solenoid that includes a housing, a pole piece, an end plate formed with or coupled to the housing, a wire coil arranged within the housing, a permanent magnet arranged between the pole piece and the end plate, an armature configured to selectively move between a first position and a second position in response to a current applied to the wire coil, and a spring biased between the armature and the pole piece. When the wire coil is de-energized, the armature is maintained in at least one of the first position and the second position. The first position is configured to be maintained by engagement with the spring and the second position is configured to be maintained by magnetic attraction between the armature and the permanent magnet through engagement between the armature and the pole piece.

In another aspect, the present disclosure provides a solenoid that includes a housing, a pole piece, an end plate formed with or coupled to the housing, a wire coil arranged within the housing, a permanent magnet arranged between the pole piece and the end plate, an armature configured to move between a first position and a second position in response to a current applied to the wire coil, and a spring configured to bias the armature. When the wire coil is de-energized, the armature is maintained in at least one of the first position and the second position. The first position is configured to be maintained by the spring and the second position is configured to be maintained by magnetic attraction between the armature and the permanent magnet through engagement between the armature and the pole piece.

In some aspects, the present disclosure provides a solenoid that includes a housing, a pole piece, an end plate formed with or coupled to the housing, a wire coil arranged within the housing, a permanent magnet arranged axially between the pole piece and the end plate, an armature configured to move between a first position and a second position in response to a current applied to the wire coil, a pin coupled to the armature, and a spring configured to bias the armature. The pole piece or the end plate includes a bearing surface that is configured to slidably receive the pin. When the wire coil is de-energized, the armature is maintained in at least one of the first position and the second position. The first position is configured to be maintained by the spring and the second position is configured to be maintained by magnetic attraction between the armature and the permanent magnet through engagement between the armature and the pole piece.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
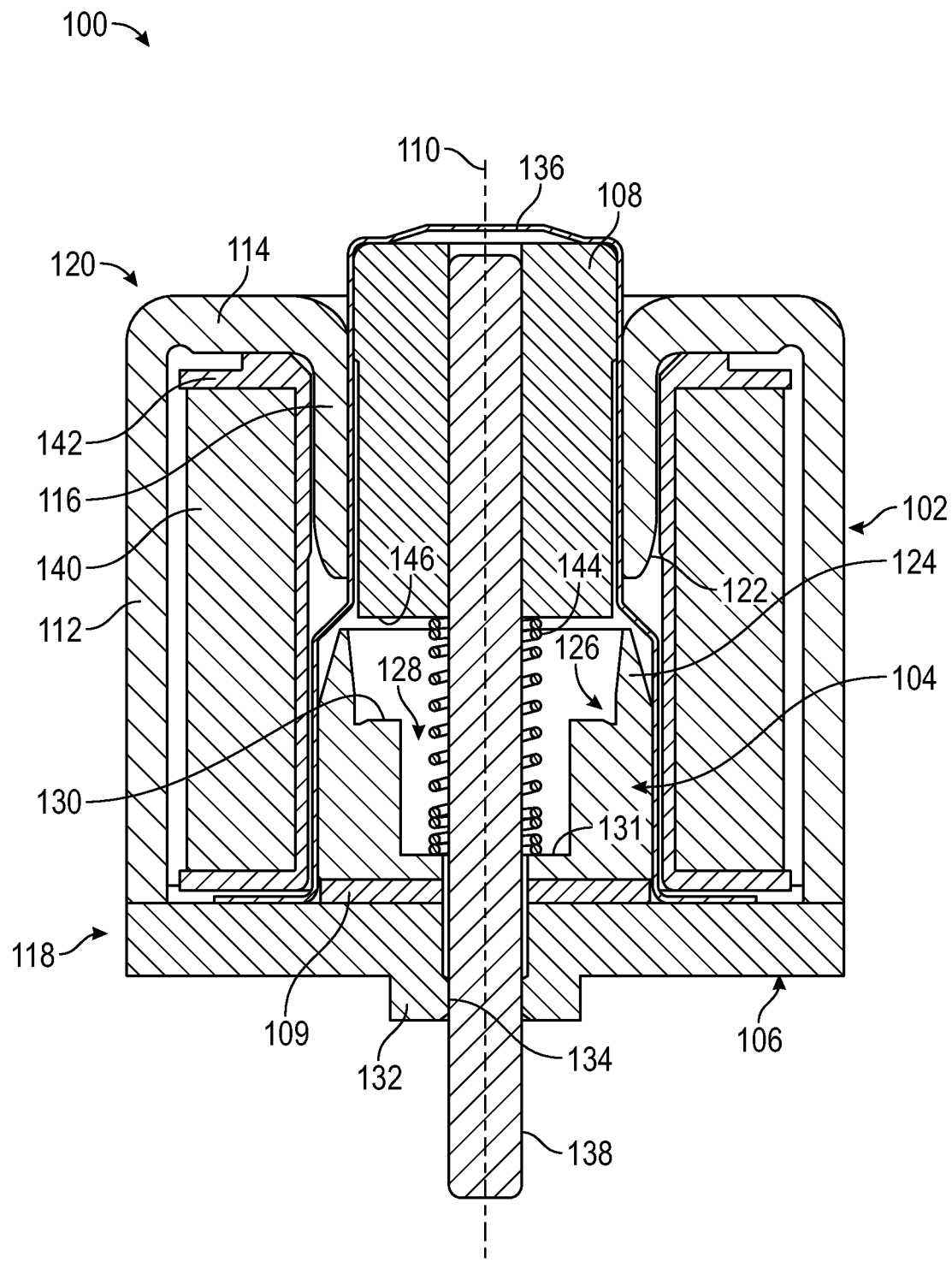
FIG. 1 is a cross-sectional view of a solenoid according to one aspect of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled," and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

The use herein of the term "axial" and variations thereof refers to a direction that extends generally along an axis of symmetry, a central axis, or an elongate direction of a particular component or system. For example, an axially-extending structure of a component may extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component or system.

The use herein of the term "separated" refers to features that are spaced apart from each other. For example, axially separated features of a component may be features that are spaced apart from each other along an axial direction. Unless otherwise specified or limited, use of the term "separated," is not intended to require any other particular alignment of features with respect to a referenced direction. For example, axially separated components may generally be spaced apart from each other relative to an axial direction, while being or not being disposed or otherwise aligned along a common axially extending reference line. Similarly, for example, radially separated components may generally be spaced apart from each other relative to a radial direction, while being separated from each other, or not separated from each other, relative to an axial direction. Similarly, for example, circumferentially separated components may generally be spaced apart from each other relative to a circumferential direction, while being separated from each other, or not separated from each other, relative to a radial direction or an axial direction.

Generally, the present disclosure provides systems and methods for a solenoid having a permanent magnet. The permanent magnet may be axially charged (i.e., the north and south poles of the magnet may be aligned with the axial or actuation direction defined by the solenoid), and may be arranged between two nonmoving components that participate in the magnetic flux loop produced by a wire coil during actuation of an armature in the solenoid. In some non-limiting examples, the permanent magnet may be arranged adjacent to an axial end of the solenoid between a pole piece and an end cap or plate. This arrangement may position the permanent magnet within the solenoid so that the permanent magnet does not axially overlap with an axial actuation range defined by a stroke of the armature in the solenoid. And this arrangement may provide a cost-effective and an efficient use of magnetic material when compared to conventional solenoids.

In general, the solenoid may include an armature that is selectively movable between one or more positions. For example, the armature may be movable from a first position to a second position, and vice versa. The armature may be held or maintained in the first position by physical engagement with a biasing mechanism (e.g., a spring, a linkage, or another mechanical device capable of providing a biasing force on a surface), and the armature may be held or maintained in the second position by magnetic attraction provided by the permanent magnet.

FIG. 1 illustrates one non-limiting example of a solenoid 100 according to the present disclosure. The solenoid 100 may include a housing 102, a pole piece 104, an end plate or cap 106, an armature 108, and a permanent magnet 109. In general, the components of the solenoid may be concentrically arranged about a central axis 110.

In the illustrated non-limiting example, the housing 102 may define a generally cylindrical shape and can be fabricated from a magnetically-conductive material (e.g., magnetic steel, iron, nickel, etc.). In other non-limiting examples, the housing 102 may define another shape, as desired. The housing 102 may be formed as a unitary component (i.e., as a single piece of material) and may include an outer wall portion 112, a top wall portion 114, and an inner wall portion 116. The housing 102 may define a first end 118 and a second end 120 arranged axially opposite to the first end 118. The outer wall portion 112 may be attached or coupled to the end plate 106 at the first end 118. The outer wall portion 112 may extend axially from the first end 118 to a junction between the outer wall portion 112 and the top wall portion 114 at the second end 120. The top wall portion 114 may extend radially inwardly (e.g., radially toward the central axis 110) from the junction between the outer wall portion 112 and the top wall portion 114 to a junction between the top wall portion 114 and the inner wall portion 116. The inner wall portion 116 may extend axially from the junction between the top wall portion 114 and the inner wall portion 116 to a tapered end 122. The inner wall portion 116 may extend axially from the second end 120 toward the first end 118. The tapered end 122 of the inner wall portion 116 may define a gradual decrease in radial thickness as it extends axially toward the first end 118.

In some non-limiting examples, the portions of the housing 102 may be formed by one or more individual components. For example, in some non-limiting examples, the inner wall portion 116 may be formed by a pole piece or another magnetically-conductive component that is attached or coupled to the housing 102, or another component of the solenoid 100. In some non-limiting examples, the end plate 106 may be formed with (e.g., as a unitary component) the housing 102, and the top wall portion 114 may be coupled to the housing 102 as an additional end cap and the inner wall portion 116 may be formed integrally with or coupled to the top wall portion 114.

The pole piece 104 may be arranged at least partially within the housing 102. The pole piece 104 may be fabricated from a magnetically-conductive material (e.g., magnetic steel, iron, nickel, etc.). In the illustrated non-limiting example, the pole piece 104 may extend axially from the permanent magnet 109 toward the second end 120 of the housing 102. The pole piece 104 may include a tapered portion 124, an armature recess 126, and a spring recess 128. The tapered portion 124 may be arranged at one axial end of the pole piece 104 and may define a gradually decreasing radial thickness as the tapered portion 124 extends axially toward the second end 120. In the illustrated non-limiting example, an axial gap is arranged between the tapered end 122 of the housing 102 and the tapered portion 124. The armature recess 126 may extend radially inwardly from a proximal end of the tapered portion 124 to define an armature surface 130. The spring recess 128 may be axially separated from the armature recess 126 and may extend radially inwardly further than the armature recess 126 to define a spring surface 131.

The end plate 106 may be attached or coupled to the first end 118 of the housing 102. For example, the first end 118 of the housing 102 may be adhesively attached, crimped, welded, or press-fit to the end plate 106. In any case, the end plate 106 may enclose the generally open first end 118 of the housing 102. The end plate 106 may be fabricated from a magnetically-conductive material (e.g., magnetic steel, iron, nickel, etc.). In the illustrated non-limiting example, the end plate 106 may define a generally annular shape that includes a bearing protrusion 132 that extends axially from a center portion of the end plate 106. The bearing protrusion 132 extends axially away from the permanent magnet 109 and includes a bearing surface 134.

In general, the armature 108 may be at least partially arranged within the housing 102 and may be movable from a first position to a second position, and vice versa. The armature 108 may be fabricated from a magnetically-conductive material (e.g., magnetic steel, iron, nickel, etc.). In the illustrated non-limiting examples, the solenoid 100 may include an armature tube 136 within which the armature 108 may be movably received. The armature tube 136 may be a thin-walled tube that is fabricated from a non-magnetically-conductive material (e.g., non-magnetically-conductive stainless steels). The armature 108 may include a pin 138 that extends axially through at least a portion of the armature 108 and protrudes axially from the armature 108. In the illustrated non-limiting example, the pin 138 may protrude axially from the armature 108 and be slidably received or engaged with the bearing surface 134 of the end plate 106. The pin 138 may further protrude axially out from the bearing protrusion 132 of the end plate 106, which may allow the pin 138 to provide a force or displacement to an external component.

In the illustrated non-limiting example, the permanent magnet 109 may be arranged axially between the pole piece 104 and the end plate 106. The permanent magnet 109 may define an annular shape and may be axially charged magnetically (i.e., the north and south poles of the permanent magnet 109 align with or are parallel to the central axis 110).

With continued reference to FIG. 1, the solenoid 100 may further include a wire coil 140 arranged within the housing 102. The wire coil 140 may be wrapped around a bobbin 142. The bobbin 142 may be fabricated from a non-magnetically-conductive material (e.g., plastic) and may be arranged within the housing 102 so that the wire coil 140 wraps around at least a portion of the armature 108. The wire coil 140 may be fabricated, for example, from a copper coil that is configured to produce a magnetic field, and thereby apply a force to the armature 108, in response to the wire coil 140 being energized (i.e., a current applied to the wire coil 140). The magnitude and direction or polarity of the magnetic field, and the force applied to the armature 108, may be governed by the magnitude and direction of the current applied to the wire coil 140. In some non-limiting examples, the wire coil 140 may be in electrical communication with a controller (not show) via electrical contacts (not shown) on the solenoid 100. The controller may be configured to selectively apply a current to the wire coil 140 with a particular magnitude and direction.

In general, the solenoid 100 may further include a biasing mechanism that is in engagement with the armature 108 to maintain or hold the armature 108 in one of the first and second positions. In the illustrated non-limiting example, the solenoid 100 may include a spring 144 that is biased between the armature 108 and the pole piece 104. Specifically, the spring 144 may be biased between and in engagement with a first surface 146 of the armature 108 and the spring surface 131 of the pole piece 104. The spring 144 may be configured to apply an axial force on the armature 108 so that the armature 108 is biased toward the first position (e.g., biased axially upwardly from the perspective of FIG. 1).

Figure 2:
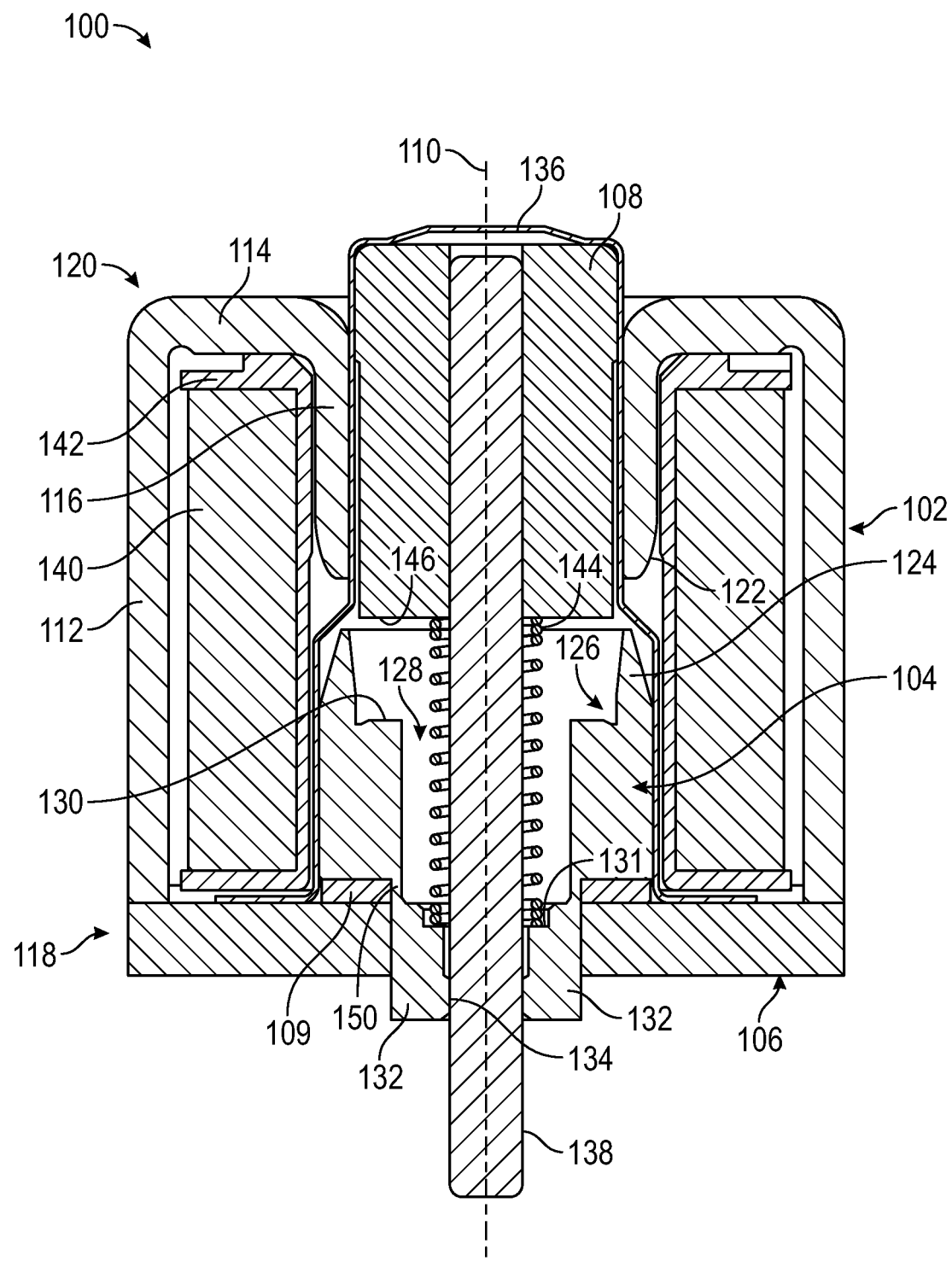
FIG. 2 is a cross-sectional view of the solenoid of FIG. 1 with a pole piece having a pin extension.
Figure 3:
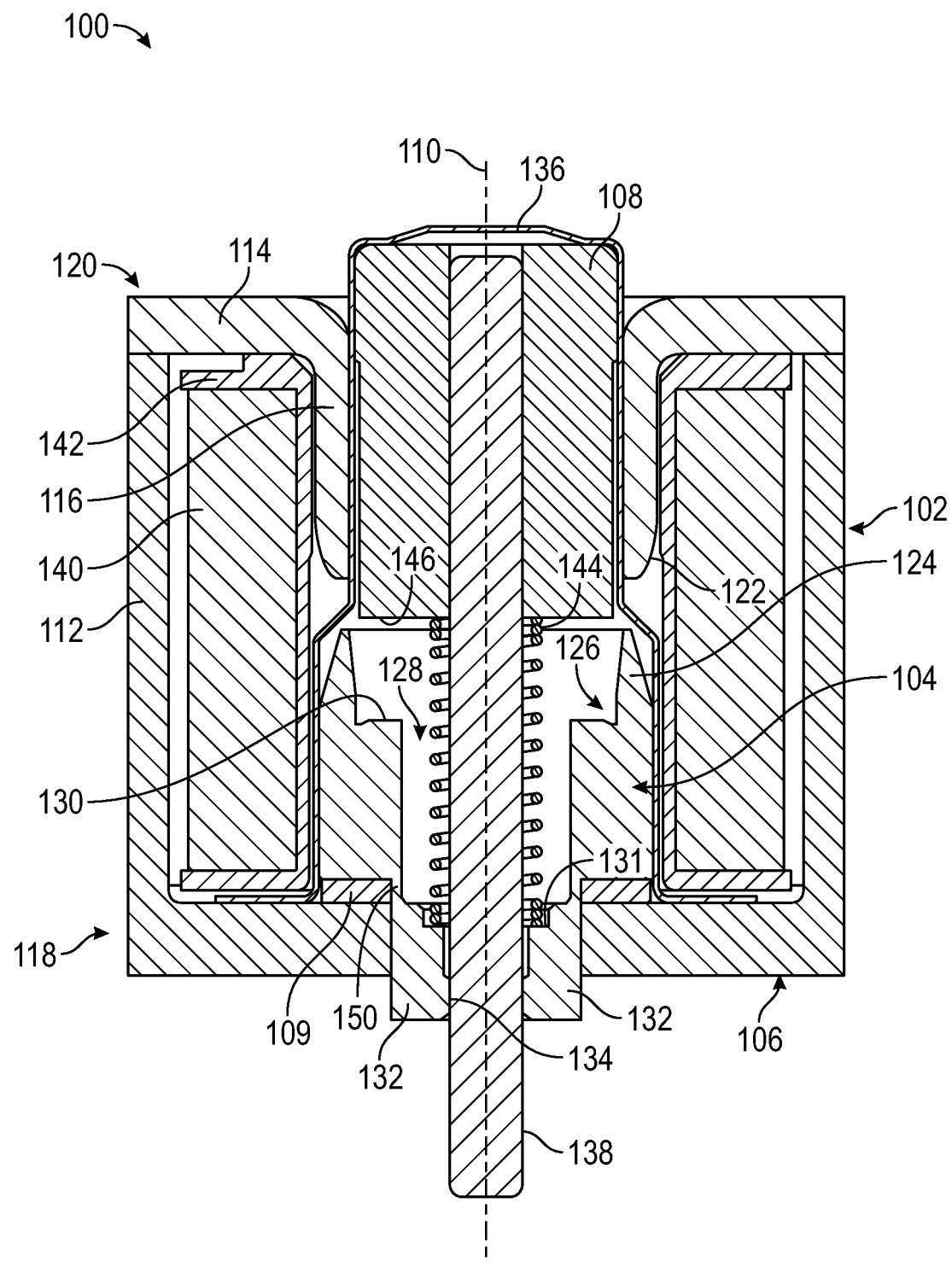
FIG. 3 is a cross-sectional view of the solenoid of FIG. 2 with an end plate formed with the housing.
Figure 4:
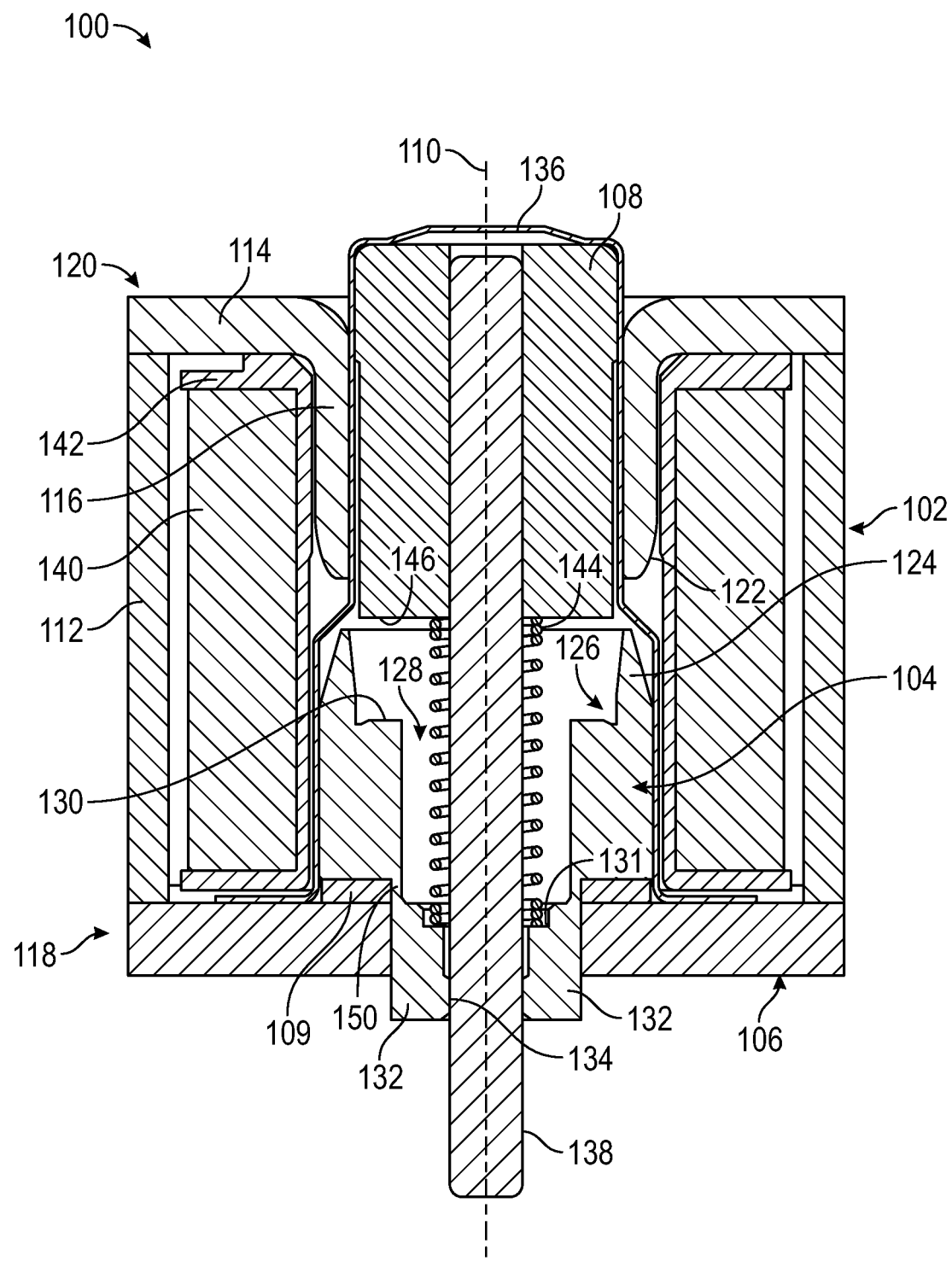
FIG. 4 is a cross-sectional view of the solenoid of FIG. 2 with a top wall portion of the housing formed as a separate component.

In some non-limiting examples, the pole piece 104 may provide a bearing surface for the pin 138. For example, FIG. 2 illustrates another non-limiting example of the solenoid 100 where the end plate 106 does not include the bearing protrusion 132 and the bearing surface 134. Rather, the bearing protrusion 132 and the bearing surface 134 are formed as part of the pole piece 104. In this non-limiting example, the pole piece 104 includes a thin-walled portion 150 that extends axially past the permanent magnet 109. As described herein, the housing 102 and the end plate 104 may be designed to be formed together or as separate components coupled together. FIG. 3 illustrates one non-limiting example of the solenoid 100 where the end plate 106 is formed with the housing 102, and the inner wall portion 116 may be formed integrally with the top wall portion 114 and coupled to the second end 120 of the housing 102. Alternatively, FIG. 4 illustrates a non-limiting example where the outer wall portion 112 of the housing 102 is formed separately from the combination of the inner wall portion 116 and the top wall portion 114 and the end plate 106.

Figure 5:
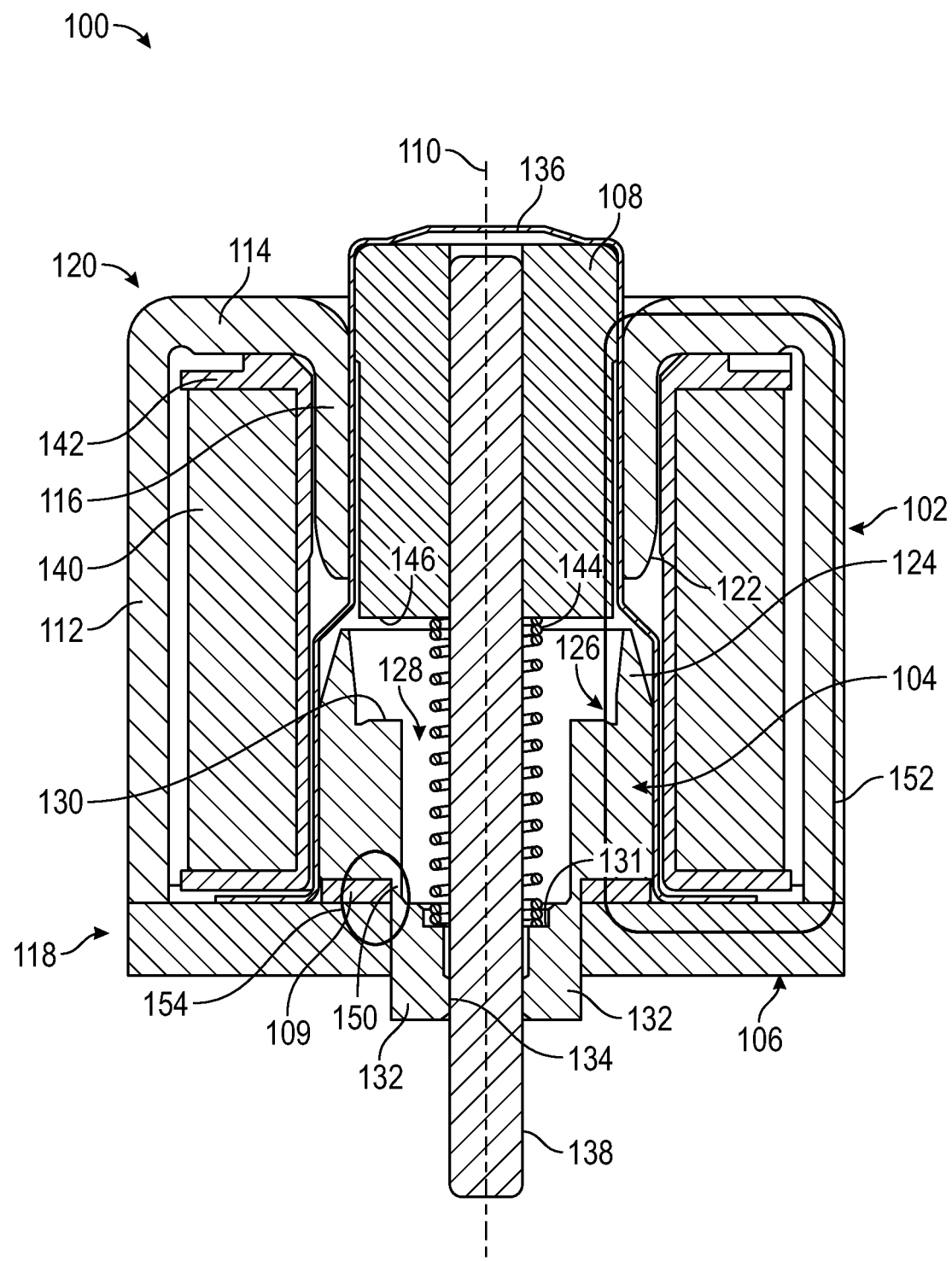
FIG. 5 is a cross-section view of the solenoid of FIG. 2 illustrating magnetic flux lines.

With reference to FIG. 5, in operation, the permanent magnet 109 and/or the wire coil 140 may generate a flux path or loop 152 that provides a force on the armature 108. In general, the permanent magnet 109 may generate the flux path 152 that circulates around and through the housing 102, the pole piece 104, and the end plate 106. The magnetic field generated by the wire coil 140 may either supplement or interrupt the flux path 152 generated by the permanent magnet 109, depending on the polarity of the current supplied to the wire coil 140 and the polarity of the resulting magnetic field, to effect movement of the armature 108. It should be appreciated that the flux path 152 illustrated in FIG. 5 is applicable to all of the designs of the solenoid illustrated herein (i.e., FIGS. 1-4, 6, and 7). In the configurations where the pole piece 104 includes the thin-walled portion 150 that extends past the permanent magnet 109, there is a possibility for flux generated by the permanent magnet 109 to undesirable short through the end plate 106 and the pole piece 104. This undesirable shorting is illustrated by the shorted flux loop 154 in FIG. 5. The shorted flux loop 154 is only shown for illustrative purposes and, as will be described herein, the solenoid 100 is designed to prevent or eliminate the shorting of the flux from the permanent magnet 109. It should be appreciated that the flux path 152 and the shorted flux loop 154 are shown on opposite sides of the solenoid 100 in FIG. 5 for illustrative purposes only. In operation, these would occur circumferentially around the solenoid 100 (i.e., on both sides of the central axis 110 in FIG. 5).

The shorted flux loop 154 may be prevented of eliminated by dimensioning the thin-walled portion 150 of the pole piece 104 to be as radially thin as possible within manufacturing tolerances. By dimensioning the thin-walled portion 150 to be radially thin in cross-section (i.e., the area through which magnetic flux can travel), the magnetic flux generated by the permanent magnet 109 flowing through the thin-walled portion 150 may be purposefully saturated, which may prevent or eliminate the generation of the shorted flux loop 154.

Figure 6:
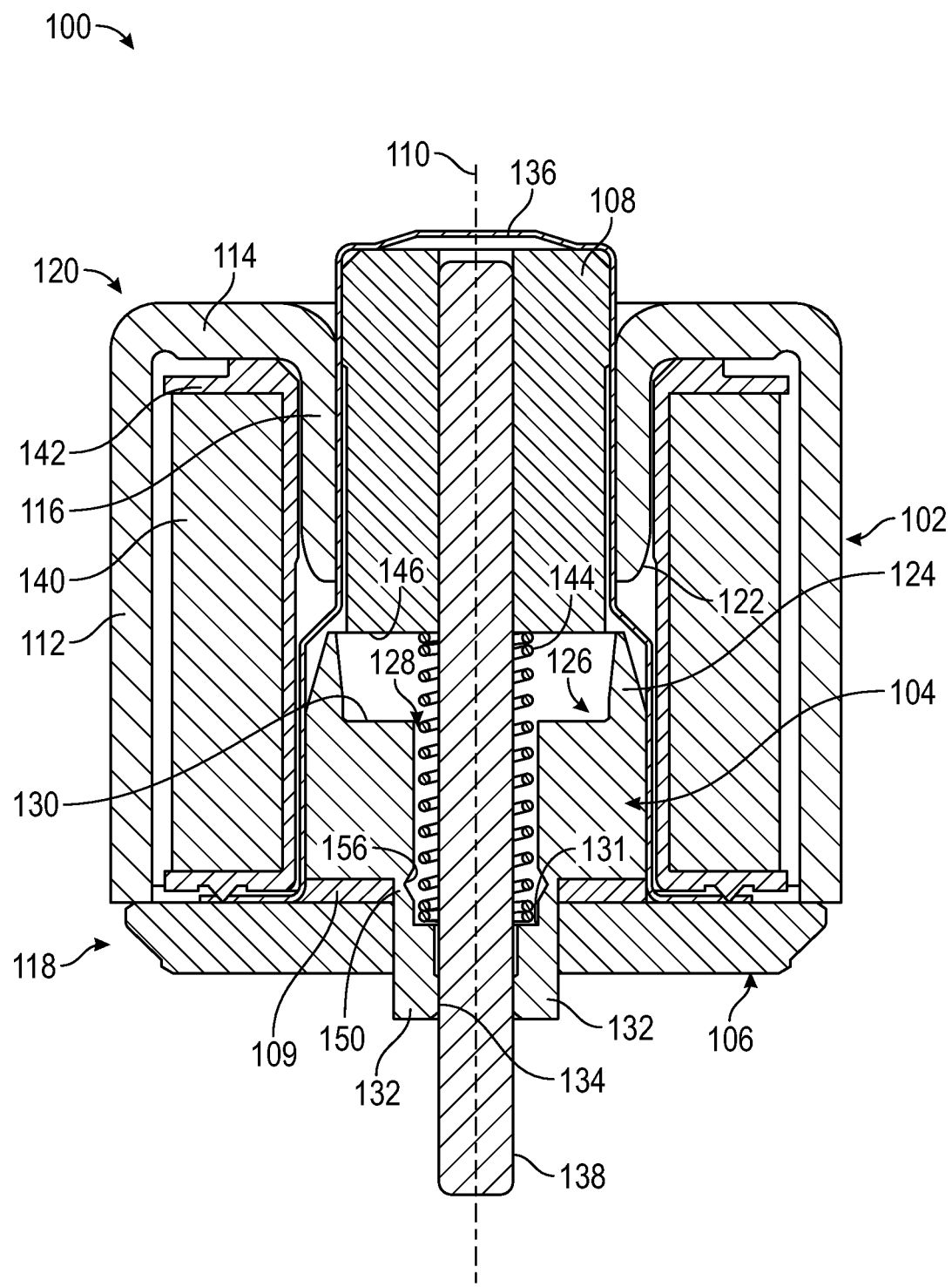
FIG. 6 is a cross-section view of the solenoid of FIG. 2 with a notched portion in the pole piece and an armature in a first position.
Figure 7:
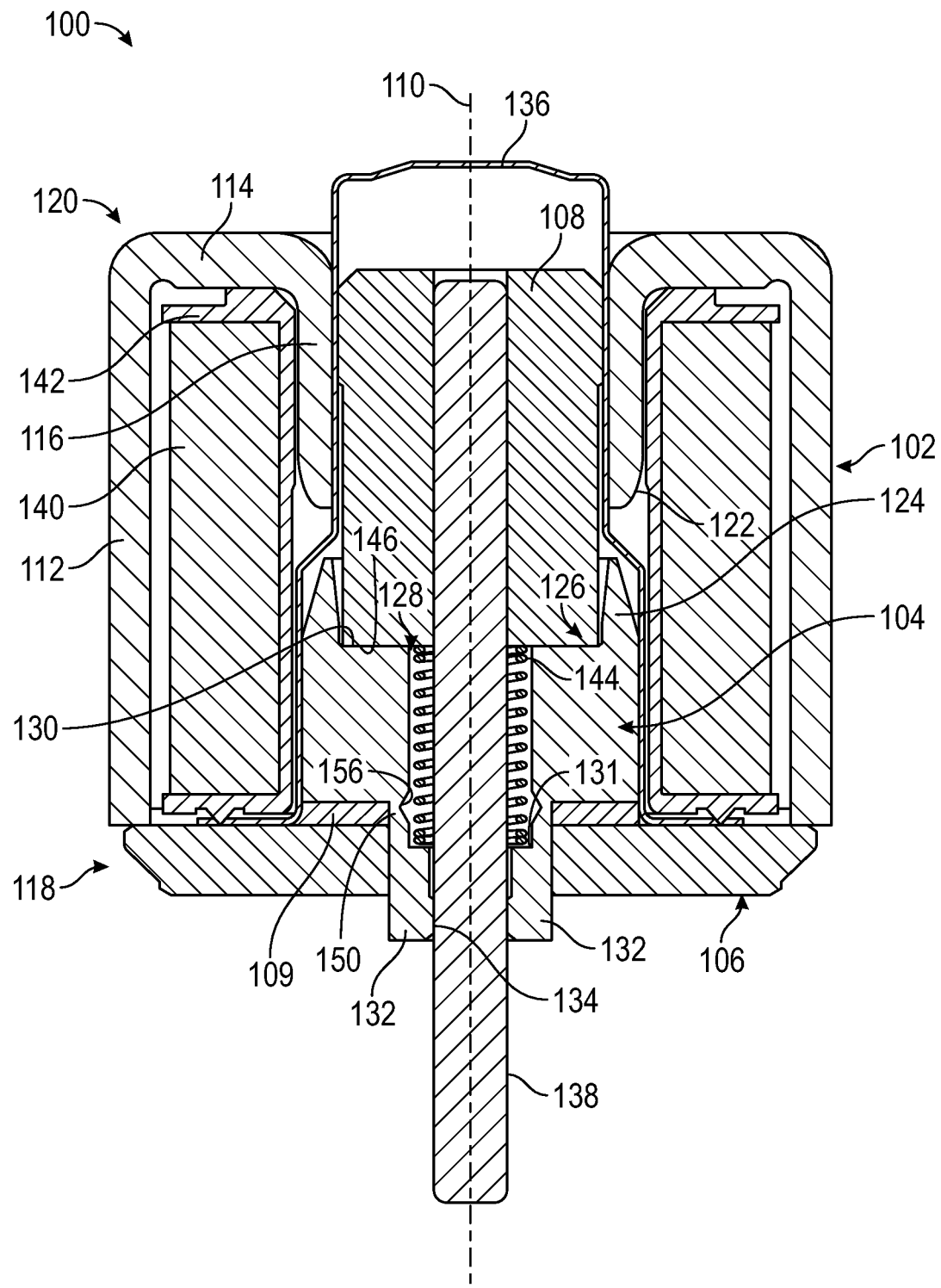
FIG. 7 is a cross-sectional view of the solenoid of FIG. 4 with the armature in a second position.

In some non-limiting example, the thin-walled portion 150 may include various geometric features that aid in reducing the radial cross-section through which flux may flow to encourage magnetic shorting. For example, FIGS. 6 and 7 illustrate a non-limiting example of the solenoid 100 where the thin-walled portion 150 includes a notch 156 that defines a radial recess in the thin-walled portion 150. The notch 156 geometrically ensures that the magnetic flux that travels through the thin-walled portion 150 saturates, which prevents or eliminates the shorted flux loop 154.

Regardless of the geometric construction of the pole piece 104 and the end plate 106, the solenoid 100 may be configured to selectively move the armature 108, and thereby the pin 138, between a first or retracted position and a second or extended position, and vice versa. General operation of the solenoid 100 will be described with reference to FIGS. 4 and 5. The following description of the operation of the solenoid 100 also applies to the solenoid designs illustrated in FIGS. 1 and 2.

FIG. 6 illustrates the armature 108 in the first position where the pin 138 is in a retracted position. With the wire coil 140 de-energized (i.e., no current supplied to the wire coil 140), the armature 108 may be maintained or held in the first position by the engagement between the spring 144 and the armature 108. The spring 144 may supply a force (e.g., in an upward direction from the perspective of FIG. 6) on the armature 108 that maintains the armature 108 in the first position. For example, the force of the spring 144 may be greater than a magnetic attraction between the armature 108 and the pole piece 104 provided by the flux path 152 generated by permanent magnet 109. When it is desired to transition the armature 108 from the first position to the second position, a current may be applied to the wire coil 140 with a first polarity. The current with the first polarity applied to the wire coil 140 may supplement or add to the flux path 152 that is generated by the permanent magnet 109, which provides an electromagnetic force on the armature 108 in a direction that opposes the force of the spring 144. In some non-limiting examples, the first polarity may be aligned with or the same as the polarity defined by the permanent magnet 109. The additional electromagnetic force on the armature 108 (e.g., in a downward direction from the perspective of FIG. 6) provided by the wire coil 140 may overcome the force of the spring 144, and the armature 108 may move from the first position to the second position illustrated in FIG. 7.

As illustrated in FIG. 7, the first surface 146 of the armature 108 may engage the armature surface 130 of the pole piece 104, when the armature 108 is in the second position. The movement of the armature 108 from the first position to the second position may axially extend the pin 138. With the wire coil 140 de-energized (i.e., no current supplied to the wire coil 140), the armature 108 may be maintained or held in the second position by the magnetic attraction between the armature 108 and the permanent magnet 109 through the engagement between the armature 108 and the pole piece 104. The arrangement of the permanent magnet 109 axially between the end plate 106 and the pole piece 104 arranges the permanent magnet 109 out of directly contact with moving elements of the solenoid 100 (i.e., the armature 108). This arrangement is efficient from a magnetic perspective because the stroke of the armature 108 does not overlap axially with the permanent magnet 109. That is, the permanent magnet 109 is axially separated from the axial stroke traversed by the armature 108 as is moves between the first position and the second position.

When it is desired to transition the armature 108 from the second position to the first position, a current may be applied to the wire coil 140 with a second polarity opposite to the first polarity. The current with the second polarity applied to the wire coil 140 may interrupt the flux path 152 generated by the permanent magnet 109, which may reduce a force on the armature 108 in a direction that acts to hold the armature 108 in engagement with the pole piece 104 (e.g., a downward direction from the perspective of FIG. 7). The interruption of the magnetic field of the permanent magnet 109 by the magnetic field generated by the wire coil 140 may reduce the force on the armature 108 a sufficient amount to allow the spring 144 to move the armature 108 to the first position (FIG. 6), which moves the pin 138 from the extended position to the retracted position.

Figure 8:
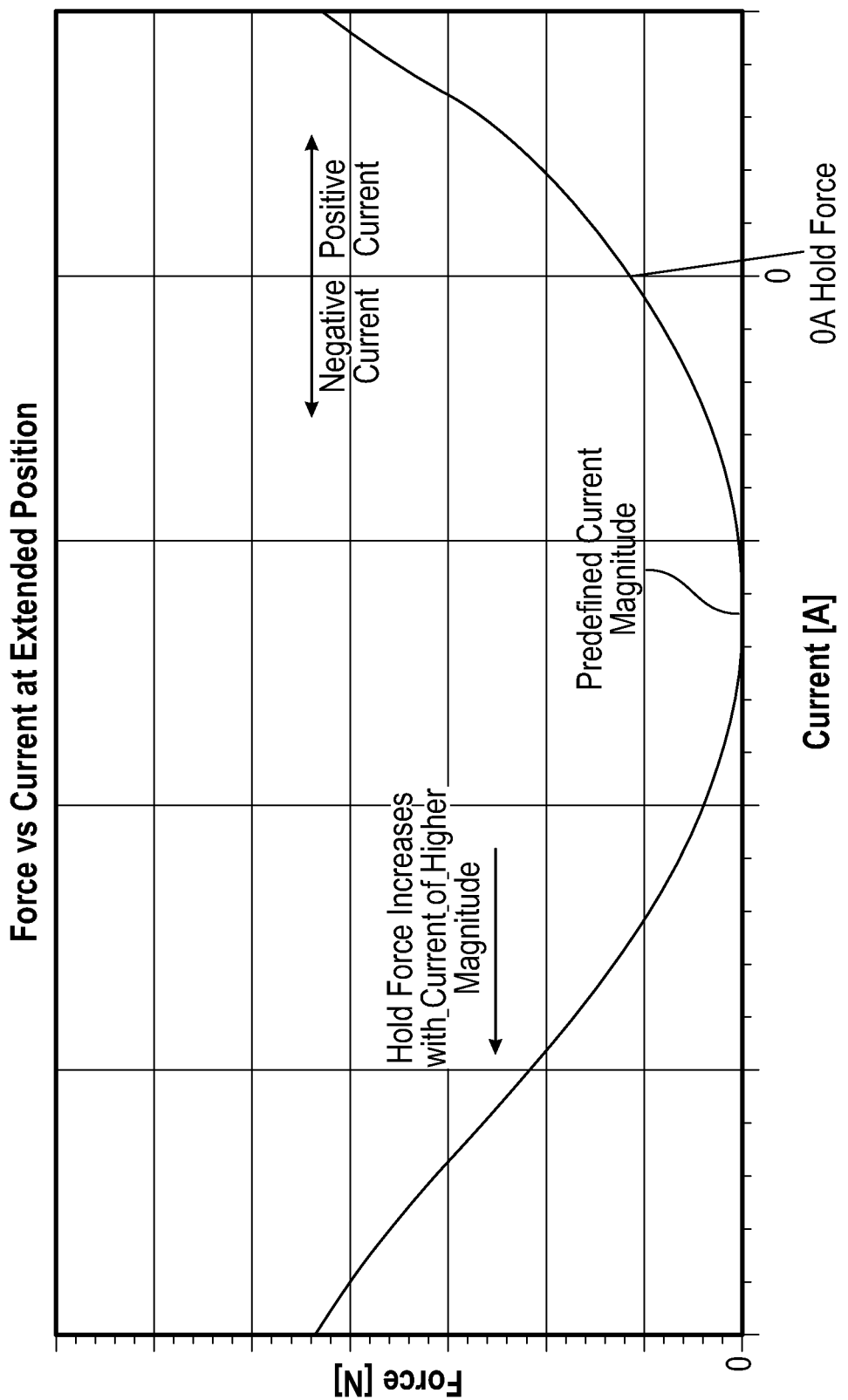
FIG. 8 is a graph illustrating a force on an armature of the solenoid of FIG. 7 as a function of current at an extended or second position.

As illustrated in FIG. 8, in the second or extended position (FIG. 7), the magnetic design of the solenoid 100 may provide a predefined current magnitude with the second polarity at which the flux path 152 generated by the permanent magnet 109 is cancelled and the magnetic force applied to the armature 108 is zero, which allows the spring 144 to move the armature 108 back to the first position. With the wire coil 140 de-energized, the flux path 152 may generate a force on the armature 108 due to the engagement between the armature 108 and the pole piece 109 (0 A hold force on FIG. 8) that acts to maintain the armature 108 in the second position (e.g., in a downward direction from the perspective of FIG. 7). The magnitude of this hold force may be greater than the force on the armature 108 provided by the spring 144, which maintains the armature 108 in the second position with the wire coil 140 de-energized.

In some non-limiting examples, when the armature 108 is moved from the second position to the first position, the wire coil 140 may be supplied with a current with the second polarity at a magnitude that is equal to the predefined current magnitude, or within a predetermined tolerance of the predefined current magnitude. By supplying a current to the wire coil 140 with a magnitude that is equal to the predefined current magnitude, or within a predetermined tolerance of the predefined current magnitude, the hold force on the armature 108 (e.g., a force urging the armature 108 downward into the pole piece 104) may be sufficiently reduced to allow the spring 144 to move the armature 108 to the first position. If the magnitude of current is not at the predefined current magnitude, or within the predetermined tolerance of the predefined current magnitude, the hold force on the armature 108 may increase and prevent the armature 108 from moving to the first position.

In general, the design of the solenoid 100 may provide a simplified design from a manufacturing and magnetics perspective, when compared to convention solenoid designs. For example, the design of the solenoid may eliminate the need to use two or more wire coils or coil bays to move the armature between two or more positions.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A solenoid, comprising:
   a housing;
   a pole piece;
   an end plate formed with or coupled to the housing;
   a wire coil arranged within the housing;
   a permanent magnet arranged between the pole piece and the end plate;
   an armature configured to selectively move between a first position and a second position in response to a current applied to the wire coil; and
   a pin coupled to the armature, wherein the pole piece includes a bearing protrusion that extends axially from the end plate and that includes a bearing surface that slidably receives the pin,
   wherein the pole piece includes a thin-walled portion that extends through the permanent magnet and is dimensioned so that magnetic flux generated by the permanent magnet saturates in the thin-walled portion.

2. The solenoid of claim 1, wherein the permanent magnet is arranged axially between the pole piece and the end plate.

3. The solenoid of claim 1, wherein the permanent magnet is axially charged.

4. A solenoid, comprising:
   a housing;
   a pole piece;
   an end plate formed with or coupled to the housing;
   a wire coil arranged within the housing;
   a permanent magnet arranged between the pole piece and the end plate;
   an armature configured to move between a first position and a second position in response to a current applied to the wire coil;
   a pin coupled to the armature, wherein the pole piece includes a bearing protrusion that extends axially from the end plate and that includes a bearing surface that slidably receives the pin; and
   a spring configured to bias the armature, wherein when the wire coil is de-energized, the armature is maintained in at least one of the first position and the second position, and wherein the first position is configured to be maintained by the spring and the second position is configured to be maintained by magnetic attraction between the armature and the permanent magnet through engagement between the armature and the pole piece,
   wherein the pole piece includes a thin-walled portion that extends through the permanent magnet and is dimensioned so that magnetic flux generated by the permanent magnet saturates in the thin-walled portion.

5. The solenoid of claim 4, wherein the spring is biased between the armature and the pole piece.

6. The solenoid of claim 5, wherein the pole piece includes an armature surface and a spring surface, and wherein the armature surface is axially separated from the spring surface and the spring is in engagement with the spring surface.

7. The solenoid of claim 4, wherein the permanent magnet is arranged axially between the pole piece and the end plate, and wherein the permanent magnet is axially charged.

8. A solenoid, comprising:
   a housing;
   a pole piece;
   an end plate formed with or coupled to the housing;
   a wire coil arranged within the housing;
   a permanent magnet arranged axially between the pole piece and the end plate;
   an armature configured to move between a first position and a second position in response to a current applied to the wire coil;
   a pin coupled to the armature, wherein the pole piece or the end plate includes a bearing protrusion that extends axially away from an exterior surface of the end plate and includes a bearing surface that is configured to slidably receive the pin; and
   an armature tube that movably receives the armature,
   wherein the pole piece includes a thin-walled portion that extends through the permanent magnet and is dimensioned so that magnetic flux generated by the permanent magnet saturates in the thin-walled portion.

9. The solenoid of claim 1, further comprising a spring biased between the armature and the pole piece,
   wherein, when the wire coil is de-energized, the armature is maintained in at least one of the first position and the second position, and
   wherein the first position is configured to be maintained by the spring and the second position is configured to be maintained by magnetic attraction between the armature and the permanent magnet through engagement between the armature and the pole piece.

10. The solenoid of claim 1, wherein the permanent magnet is arranged axially between the pole piece and the end plate, and wherein the permanent magnet is axially charged.

11. The solenoid of claim 1, wherein the thin-walled portion is configured to retain the permanent magnet on the end plate.

12. The solenoid of claim 1, wherein the thin-walled portion defines a radial recess to further reduce a radial cross section at the thin-walled portion.

13. The solenoid of claim 12, wherein the radial recess is provided on a radially inner surface of the thin-walled portion.

14. The solenoid of claim 4, wherein the thin-walled portion is configured to retain the permanent magnet on the end plate.

15. The solenoid of claim 8, the solenoid further comprising a spring configured to bias the armature, wherein when the wire coil is de-energized, the armature is maintained in at least one of the first position and the second position, and wherein the first position is configured to be maintained by the spring and the second position is configured to be maintained by magnetic attraction between the armature and the permanent magnet through engagement between the armature and the pole piece.

16. The solenoid of claim 8, wherein the thin-walled portion is configured to retain the permanent magnet on the end plate.

17. The solenoid of claim 8, wherein the thin-walled portion defines a radial recess to further reduce a radial cross section at the thin-walled portion.

18. The solenoid of claim 17, wherein the radial recess is provided on a radially inner surface of the thin-walled portion.

\* \* \* \* \*